United States Patent [19]
Johnson

[11] 3,808,909
[45] May 7, 1974

[54] COLLAPSIBLE LINK FOR A TREE SHEAR

[75] Inventor: Earl Clinton Johnson, Dubuque, Iowa

[73] Assignee: Deere & Company, Moline, Ill.

[22] Filed: Apr. 4, 1973

[21] Appl. No.: 347,838

[52] U.S. Cl.................... 74/585, 74/581, 74/584, 144/34 E
[51] Int. Cl............................................. G05g 1/00
[58] Field of Search ............ 74/585, 584, 582, 581; 144/34 R, 34 B, 34 E

[56] References Cited
UNITED STATES PATENTS

| | | | |
|---|---|---|---|
| 3,768,528 | 10/1973 | Barwise............................ | 144/34 E |
| 3,675,691 | 7/1972 | Denovan et al............... | 144/34 E X |
| 2,767,597 | 10/1956 | Narsted............................. | 74/585 |

Primary Examiner—Andrew R. Juhasz
Assistant Examiner—W. D. Bray

[57] ABSTRACT

A tree shear includes a pair of cutting blades which are respectively carried by a pair of blade support arms that are mounted for pivotal movement towards and away from each other about an axis which extends horizontally when the tree shear is level. Mounted for movement about respective axes which extend parallel to the axis of movement of the blade support arms are a pair of crankshafts that are located above and spaced equidistant from the pivotal axis of the blade support arms. A pair of force-transmitting links are respectively pivotally interconnected between the pair of crankshafts and the pair of blade support arms and a hydraulic actuator is located between and is pivotally interconnected with the pair of crankshafts and is selectively extensible and retractable to move the crankshafts about their respective pivot axes. The force-transmitting links are collapsible and are designed to transmit a cutting force to the cutting blades as long as the compressive forces therein are below a predetermined amount. If the forces rise above this predetermined amount, the link will collapse and permit the hydraulic actuator to finish its stroke without further transmittal of force to that blade associated with the link which collapsed.

10 Claims, 5 Drawing Figures

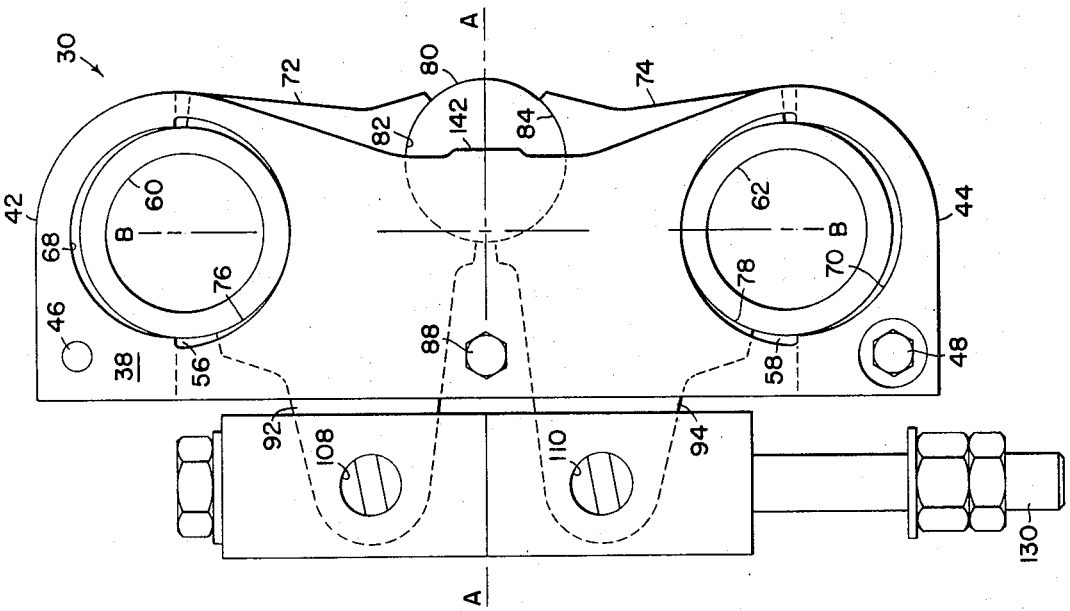
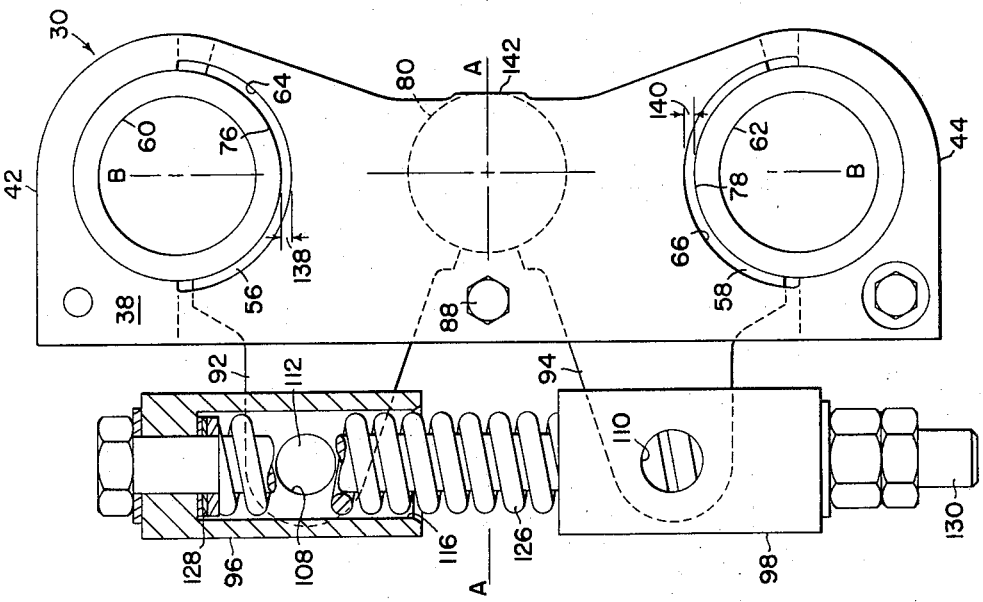

COLLAPSIBLE LINK FOR A TREE SHEAR

BACKGROUND OF THE INVENTION

The present invention relates to a tree shear and more particularly relates to a collapsible force-transmitting link for use in a tree shear.

Tree shears are known which utilize a pair of shear blades mounted for movement towards and away from each other. The movement of these blades is effected through means of one or two hydraulic acutators which are connected to the blades through some sort of force-transmitting linkage. The force necessary for shearing a tree by using two blades in this manner is upwards from fifty tons for shearing trees having diameters ranging from 12 to 16 inches. In order to pass through a tree easily, the shear blades must of necessity be constructed of thin material. Thus, it is apparent that if the shear blades should contact a material which offers a resistance to cutting greater than that offered by a tree trunk, the resultant forces imposed upon the shear blade will destroy the shear blade.

Accordingly, it is a broad object of the invention to provide a collapsible force-transmitting link for use in linkages for operating tree shear blades, the force-transmitting link having the capability of transmitting a predetermined force large enough for moving an associated shear blade into the trunk of a tree but being collapsible to prevent damage to the shear blade upon a predetermined maximum force acting to compress the force-transmitting link.

A more specific object is to provide a collapsible link, as above described, which includes a pair of guide plates fixed together and having portions in loosely sandwiching relationship to a pair of link sections, the guide plates having first and second bushings loosely received in openings at the opposite ends thereof and the link sections respectively having oppositely facing recesses engaged with the bushings and having opposed recesses engaging the opposite sides of a roller disposed therebetween and spring means being connected to the link sections and biasing them to a predetermined uncollapsed position relative to the bushings and the roller.

A further object is to provide a collapsible link as just described wherein the amount of force that the link is capable of transmitting may be adjusted by changing the effective length of the spring means and to provide a finished surface on the guide plates which is so located relative to the roller that the operator is visually aided when making an adjustment by noting the change in position of the roller relative to the finished surface.

These and other objects will become apparent from the following description and the appended drawings.

SUMMARY OF THE INVENTION

According to the present invention there is provided a novel force-transmitting link and more specifically there is provided a collapsible force-transmitting link which is particularly adapted for use in linkages for operating the blades of a tree shear.

The collapsible force-transmitting link is basically an over-center linkage which is biased to an uncollapsed position by spring means which may be adjusted to change the biasing force and which may be adjusted to move the linkage closer or farther away from center to respectively increase or decrease the amount of force capable of being transmitted by the link. The link includes a pair of link sections which are seated against a roller having an axis which is movable relative to the respective axes of connection of the opposite ends of the link, the axis of the roller being shiftable through adjustment of the spring bias means and the adjustment being observable by the operator through means of a finished surface which is positioned so as to bear a predetermined relationship to the roller when a proper adjustment has been made.

BRIEF DESCRIPTION OF THE DRAWINGS

FIG. 2 is an enlarged view, partially in section, of the left collapsible link shown in FIG. 1 with the link being shown in its uncollapsed condition.

FIG. 3 is a view similar to FIG. 2 but showing the link in its collapsed condition.

DESCRIPTION OF THE PREFERRED EMBODIMENT

Figure 1:
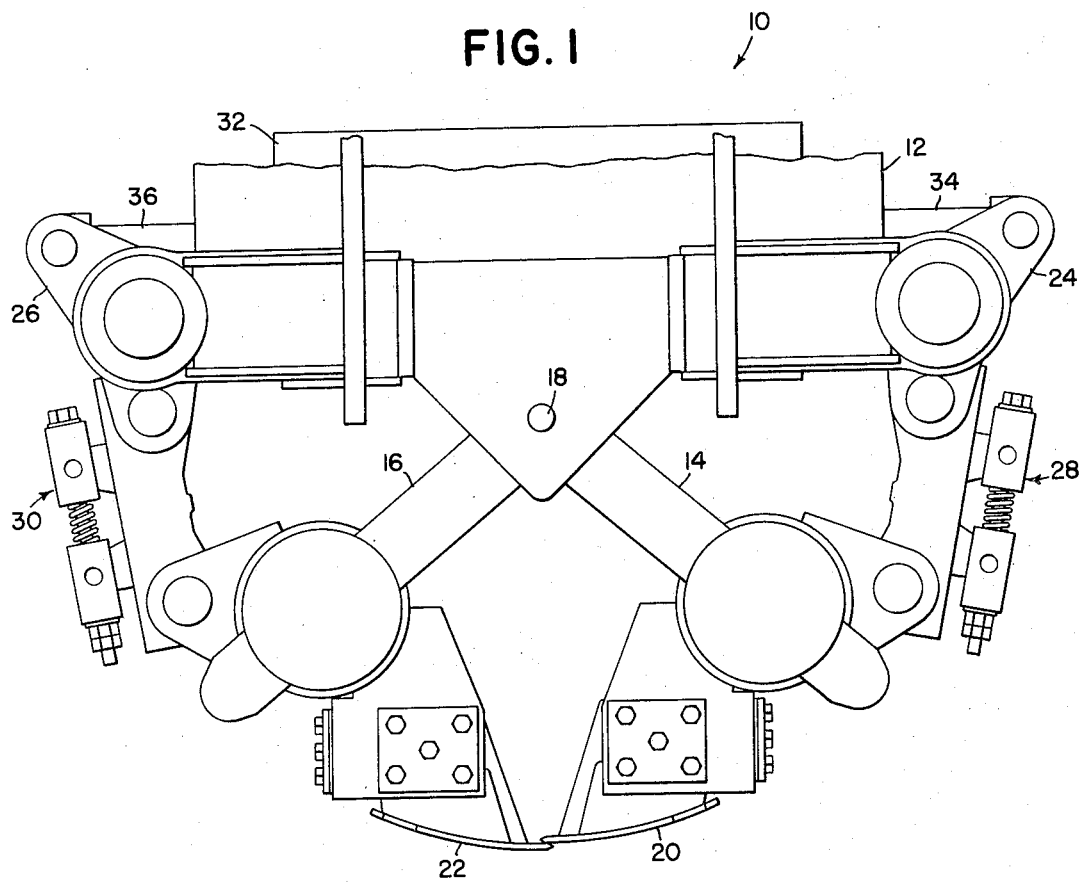
FIG. 1 is a rear elevational view of a tree shear with portions broken away and embodying a pair of collapsible links constructed according to the principles of the present invention.
Figure 4:
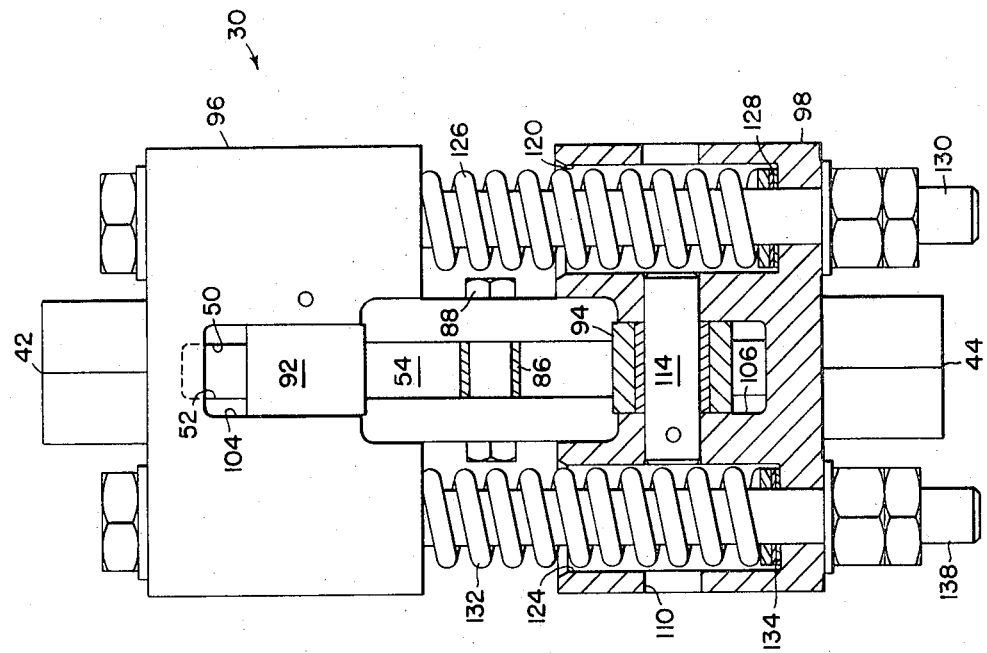
FIG. 4 is a left side view of the link shown in FIG. 2 and showing portions thereof in section.
Figure 5:
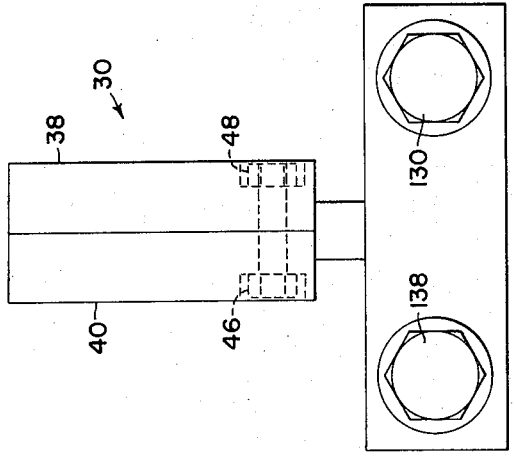
FIG. 5 is a top plan view of the link shown in FIG. 4.

Referring now to FIG. 1, therein is shown a tree shear indicated in its entirety by the reference numeral 10. The tree shear 10 includes a main frame 12 having right and left blade support arms 14 and 16 respectively pivotally connected to the underside thereof for pivotal movement about an axis defined by a pivot connection 18. Right and left blades 20 and 22 respectively are secured to lower portions of the blade support arms 14 and 16. The blades 20 and 22 are respectively constructed of relatively thin plates which are cylindrically curved so as to respectively lie on fixed radii from the axis of the pivotal connection 18. Thus, it will be appreciated that the blades may be moved towards and away from each other by swinging the blade support arms 14 and 16 about the pivotal connection 18. The tree shear 10 includes respective linkages for moving the blade support arms simultaneously symmetrically about the pivot connection 18. Specifically, right and left crankshafts 24 and 26 are mounted for pivotal movement about respective axes extending parallel to the axis of the pivot connection 18 and located above and equidistant from the pivot connection 18. Right and left collapsible links 28 and 30, respectively, are connected between the right crankshaft 24 and the right blade support arm 14 and between the left crankshaft 26 and the left blade support arm 16. Located between the crankshafts 24 and 26 is a hydraulic actuator 32 having oppositely extending left and right piston rods having their respective outer ends pivotally connected to the crankshafts 24 and 26. The hydraulic actuator includes structure (not shown) by which the piston rods 34 and 36 are selectively simultaneously extendible and retractable so as to effect simultaneous rotation of the crankshafts and simultaneous movement of the blade support arms 14 and 16 through means of the collapsible links 28 and 30.

The collapsible links 28 and 30 are substantially identical and for the sake of brevity, only the left link 30 is described in detail. The left link 30 includes a guide structure comprising a pair of elongate guide plates 38 and 40 respectively having upper and lower portions indicated at 42 and 44 which are respectively fixed in face-to-face engagement with each other by means of upper and lower oppositely extending cap screws 46 and 48. Opposed recesses 50 and 52 are respectively located in the plates 38 and 40 between the upper and lower portions 42 and 44, the recesses cooperating to form an opening 54 extending widthwise through the fixed-together plates 38 and 40. The plates 42 and 44 are shaped identically and are shaped so as to be symmetrical relative to an imaginary plane extending vertically to the plates and containing a line A—A, as shown in FIGS. 2 and 3. Extending transversely through the plates 38 and 40 at respective locations spaced equidistant from the opposite sides of the line A—A are upper and lower openings 56 and 58, respectively, in which are located upper and lower bushings 60 and 62, respectively. The upper bushing 60 is mounted on a pivot pin carried by the tree shear main frame 12 and the lower bushing 62 is mounted on a pivot pin carried by the left blade support arm 16. The center of the bushings 60 and 62 lie on a centerline B—B which is perpendicular to the line A—A.

Relative to the line A—A, the upper and lower openings 56 and 58, respectively, consist of inner outwardly facing semicylindrical portions 64 and 66 and outer inwardly facing semicylindrical portions 68 and 70. For a purpose to be explained below, the outer semicylindrical portions 68 and 70 are equal in diameter to the upper and lower bushings 60 and 62 while the inner semicylindrical portions 64 and 66 are larger in diameter than the bushings.

Arranged symmetrically relative to the line A—A and guidingly received in the opening 54 are upper and lower plate-like link sections 72 and 74, respectively, having outer recesses 76 and 78 facing outwardly and being shaped complementary to and receiving the upper and lower bushings 60 and 62. A roller 80 is positioned in the opening 54 between the plates 38 and 40 and has its longitudinal center located on the line A—A. Thus, the axis of the roller 80 is parallel to the axes of the respective bushings 60 and 62. The link sections 72 and 74 are pivotally connected to the roller through means of respective inner recesses 82 and 84 which are shaped complementary to and receive the roller 80 and which face each other and the line A—A. In order to keep the opposed surfaces of the opening 54 in proper spaced relationship for guiding the link sections 72 and 74 and the roller 80, a spacer 86 is positioned centrally on the line A—A to one side of the roller 80 and is held in place by a bolt 88 which extends therethrough and through the guide plates 38 and 40.

Located to one side of the guide plates 38 and 40 is a compression spring assembly 90 which is connected between respective connecting ear portions 92 and 94 of the upper and lower link sections 72 and 74 for biasing the ear portions away from each other so as to effect a normally uncollapsed condition in the link 30 as shown in FIG. 2. The spring assembly 90 comprises upper and lower block-like spring retaining members 96 and 98 respectively having opposed inner ends 100 and 102 from which slots or openings 104 and 106 respectively extend outwardly. The slots or openings 104 and 106 are centered between the respective opposite sides of the members 96 and 98 and respectively receive the connecting ears 92 and 94 of the upper and lower link sections 72 and 74. Bores 108 and 110 respectively extend widthwise through the retaining members 96 and 98 and intersect the slots or openings 104 and 106. The connecting ears 92 and 94 respectively of the link sections 72 and 74 are apertured and receive respective pins 112 and 114 which are located in the bores 108 and 110. Thus, the link sections 72 and 74 are respectively pivotally connected to the spring retaining members 96 and 98 for relative movement about parallel axes which in turn extend parallel to the axes of the respective bushings 60 and 62 and to the central axis of the roller 80. Located in the upper spring retaining member 96 at the opposite ends of the pin 112 are first and second cylindrical spring receptacles having downwardly opening ends and being arranged with their longitudinal axes extending perpendicular to the axis of the bore 108, only the first receptacle being shown at 116. Similarly, located in the lower spring retaining member 98 at the oppostie ends of the pin 114 are first and second cylindrical spring receptacles 120 and 124 which are in axial alignment with the first and second spring receptacles of the upper spring retaining member 96. Extending between and having opposite end portions received in the first spring receptacles 116 and 120 is a first compression coil spring 126 having opposite ends respectively in engagement with a stack of washers which include shim-like washers 128 at the closed ends of the receptacles. Extending through the upper and lower spring retaining members 96 and 98 in coaxial relationship to the first receptacles 116 and 120, the spring 126 and the stacks of washers is a first bolt 130 having a head in engagement with a washer at the top surface of the upper retaining member 96 and having adjusting and lock nuts threaded on the bottom end thereof, the adjusting nut being positioned against a washer which is seated against the bottom surface of the lower spring retaining member 98. Similarly, extending between and having opposite end portions received in the second spring receptacles of the members 96 and 98 is a coil compression spring 132 having opposite ends engaged with respective stacks of washers which include shim-like washers 134. Extending through the spring retaining members 96 and 98 in coaxial relationship to the second spring receptacles, the second spring 132 and the stacks of washers is a second bolt 136 having a head in engagement with a washer seated on the top surface of the upper spring retaining member 96 and having an adjusting nut and a lock nut threadedly received on its lower end, the adjusting nut being in engagement with a washer which is in turn engaged with the lower surface of the lower spring retaining member 98.

Thus, it will be appreciated that the springs 126 and 132 act to bias the connecting ear portions 92 and 94 of the upper and lower link sections 72 and 74 away from each other to effect the seating of the bushings 60 and 62 into the outer semicylindrical portions 68 and 70 respectively of the upper and lower openings 56 and 58, as shown in FIG. 2. Since the inner semicylindrical portions 64 and 66 are of a greater diameter than the outer semicylindrical portions, the portions 64 and 66 are spaced from the bushings 60 and 62, as at 138 and 140. When a predetermined force acts in compression along the line B—B, the link 30 will be moved to its collapsed condition shown in FIG. 3, the bushings 60 and 62 then being seated against the inner semicylindrical portions 64 and 66 of the openings 56 and 58. It is further to be noted that the center of the roller 80 travels along the line A—A when the link 30 moves from its uncollapsed condition to its collapsed condition. The predetermined force at which the link 30 will collapse with a given set of springs may be adjusted by adding or substracting one or more shim-like washers to each of the stacks of washers 128 and 134 to change the preload on the springs 126 and 132 or by adjusting the adjusting nuts to cause the roller 80 to have its center adjusted relative to the centerline B—B connecting the centers of the bushings 60 and 62. Thus, when the roller's center is positioned on the centerline B—B as shown in FIG. 2, a maximum force will be required to collapse the link 30. Normally it would be desired to have the center of the roller moved slightly to the right of the line B—B to ensure that the link does not function as a rigid link. In order to aid in the adjustment of the center of the roller 80, the guide plates 38 and 40 are provided with a finished surface 142 which, when observed in the direction of the central axis of the roller 80, will appear tangent to the roller 80 when the center of the roller is on the centerline B—B. Thus, an operator can easily perceive when the roller is overcenter.

In operation, the collapsible links 28 and 30 will normally be set to transmit to the right and left blades 20 and 22 the force necessary for cutting the trees intended to be harvested. Assuming that the operator has actuated the actuator 32 so as to move the blades 20 and 22 together to shear a tree located therebetween and that the left blade 22 comes into contact with an obstacle which affords more resistance to cutting than the trees intended to be cut. The left collapsible link 30 will then collapse to the position shown in FIG. 3 when the compression force in the link 30 becomes greater than that which the link is intended to transmit. When the link 30 collapses, the actuator 32 will continue its cutting stroke without causing further movement of the left blade 22. The operator can then actuate the actuator 32 in the direction for moving the blades to their open position whereupon the collapsed link 30 will move back to its uncollapsed condition shown in FIG. 2 through the action of the springs 126 and 132.

If the shear fails to shear trees of the desired size due to premature collapse of the links, the operator may adjust the links to transmit more force. For example, the left link 30 may be adjusted by removing the link from the shear and then loosening the lock nuts on the bolts 130 and 136 of the spring assembly 90. Once the lock nuts are loosened, the adjusting nuts are tightened until the bushings 60 and 62 move away from the outer semicylindrical portions 68 and 70 of the openings 56 and 58, respectively. The cap screws 46 and 48 holding the guide plates 58 and 40 together are then removed along with the spacer-carrying bolt 136 and the plates 38 and 40 are then separated. The spring assembly 90 is then dismantled by removing the locking nut and adjusting nuts from the bolts 130 and 136 and then withdrawing the bolts from the upper and lower spring retaining members 96 and 98. Additional shim-like washers 128 and 136 are then added to each pack of shims at the opposite ends of the springs 126 and 132. The link 30 is then reassembled in reverse order with the adjusting nuts being loosened after reinstallation of the bushings 60 and 62 until the roller 80 has one side thereof flush with the finished surface 142 on the guide plates 38 and 40, as shown in FIG. 2. At this point, the bushings should be bearing, or nearly so, in the outer semicylindrical portions 68 and 70 of the openings 56 and 58, respectively. The lock nuts are then tightened to retain the adjusting nuts in their adjusted position.

The cutting force transmitted by the link 30 can also be adjusted without disassembling the link 30 by loosening or tightening the lock and adjusting nuts on the bolts 130 and 136 so that the roller 80 respectively moves leftwardly and rightwardly along the line A—A.

I claim:

1. A collapsible force-transmitting link comprising: a roller having a central axis located in an imaginary plane passing through a diameter of said roller; a pair of link sections, one being a mirror image of the other, arranged symmetrically on opposite sides of said plane; said pair of link sections each including a recess curved complementary to and receiving said roller; said pair of link sections respectively including a pair of mounting portions spaced to one side of said roller in the direction of an extension of said diameter; compression spring means extending between and being connected to said pair of mounting portions for movement about a pair of axes extending parallel to said roller central axis and being located on a first line of centers intersecting said plane at a right angle; said compression spring means acting to separate said pair of mounting portions and including one-way retaining means interconnecting for preventing the latter from being separated a distance greater than a predetermined maximum when the link is in an uncollapsed condition while permitting said pair of mounting members to move together upon the spring means being compressed; said link including a pair of pivot connection means, adapted for securing the link between two members between which force is to be transmitted; and said pair of pivot connection means respectively including first and second bearing surface means formed in said first and second link sections about first and second axes located on a second line of centers intersecting said plane at right angles and being located slightly to one side of the roller central axis, in a direction opposite from said first line of centers, when said pair of mounting means are separated by said predetermined maximum distance.

2. The collapsible link defined in claim 1 and further including link section guide means comprising a pair of guide plates fixed in face-to-face engagement with each other and respectively including opposed recessed portions defining an opening guidingly receiving said link sections and roller and at least one of the guide plates including a finished surface extending perpendicular to and intersecting said imaginary plane at a location where the surface appears to be tangent to one side of said roller when viewed along a line of sight extending parallel to the roller axis when said pair of mounting portions are located at said predetermined maximum distance apart; and said one-way retaining means including manually adjustable means for changing the distance between said pair of mounting portions when the link is in said uncollapsed condition, whereby an operator may adjust said distance between said pair of mounting portions so as to attain said predetermined maximum distance by manipulating said adjustable means until said roller moves to a position whereat said finished surface appears tangent thereto.

3. A collapsible link for transmitting a predetermined cutting force from a powered crankshaft to a cutting blade structure comprising: first and second link sections connected together for relative pivotal movement about a first axis; said first and second link sections respectively including first and second bearing portions spaced equally from the opposite sides of said first axis and being adapted for connection to said crankshaft and blade structure for pivotal movement about second and third axes extending parallel to said first axis; a compression spring assembly including first and second members defining cylindrical, closed-end receptacle means having opposed open ends; compression coil spring means being positioned within said receptacle means and acting to bias said members apart; bolt means extending through said first and second members in centered disposition relative to said receptacle means and spring means and including head means bearing on said first member and nut means bearing on said second member whereby the separating force exerted on the first and second members may be adjusted by turning the nut means; and said first and second link sections being respectively pivotally connected to said first and second members for movement about fourth and fifth axes spaced equidistant from and located to one side of said first axis.

4. The collapsible link defined in claim 3 and further including a plurality of removable shims positioned between at least one end of the spring means and one closed end of the receptacle means whereby the force exerted on the first and second members may be adjusted by varying the number of shims so positioned.

5. The collapsible link defined in claim 3 wherein said receptacle means comprises opposed pairs of receptacles and said spring means comprises a pair of springs respectively positioned in said pair of receptacles.

6. The collapsible link defined in claim 3 wherein the pivotal connection between the first and second link sections comprises a roller having its axis lying on said first axis and said first and second link sections each having a receptacle shaped complementary to and receiving said roller therein.

7. The collapsible link defined in claim 6 wherein said first and second link sections and said roller have substantially the same thickness and have opposite flat sides; and link section guide means including a pair of guide plates being fixed in face-to-face engagement with each other and including surface means defining an opening guidingly receiving and engaging opposite flat sides of said link sections and roller.

8. The collapsible link defined in claim 7 wherein said first and second bearing portions respectively comprise first and second, oppositely opening generally semicircular recesses; first and second cylindrical bushings being respectively received in said first and second bearing portions; said pair of guide plates being provided with first and second transverse openings spaced equidistant from said roller; said first opening receiving said first bushing and said second opening receiving said second bushing; and said first and second openings respectively including first generally semicylindrical surface portions shaped complementary to the bushings and facing each other and respectively including second semicylindrical surface portions being slightly larger in diameter than the bushings and respectively facing an adjacent one of said first generally cylindrical surface portions.

9. A collapsible link for transmitting a predetermined cutting force from a powered crankshaft to a cutting blade structure comprising: a compression spring assembly including first and second members defining cylindrical, closed-end receptacle means having opposed open end means; compression coil spring means being positioned within said receptacle means and acting to bias said first and second members apart; bolt means extending through said first and second members in centered disposition relative to the receptacle means and to the spring means and including head means fixed to one end and nut means threadedly received on its other end, and said first and second members being located between said head means and nut means whereby the separating force exerted on the first and second members may be adjusted by turning the nut means; first and second flat link sections respectively being pivotally connected to said first and second members for rotation about a pair of parallel axes intersecting said bolt means; a roller being located to one side of said first and second members equidistant from said pair of parallel axes; said first and second link sections having opposed bearing surfaces shaped complementary to and being engaged with opposite sides of said roller; a pair of plates being secured together and having opposed flat surfaces disposed in parallel-spaced relationship and respectively embracing opposite faces of said link sections and said roller and thus forming a link section guide structure; a pair of openings extending transversely through said link section guide structure at respective locations spaced equally from said roller; a pair of bushings being respectively received in said pair of openings, said openings respectively being bounded by surface means for guiding the bushings along a line joining their centers between first spaced apart positions occupied by the bushings when the link is in an uncollapsed condition and second spaced apart positions, closer together than said first positions, when the link is in a collapsed condition; and said spring means, bushings and roller being so located relative to each other that said spring means acts through said link sections to normally maintain said bushings in their first positions.

10. The collapsible link defined in claim 9 wherein said pair of openings are each bounded by first and second opposed substantially semicylindrical surfaces, said first semicylindrical surfaces facing in the direction of said roller and being shaped complementary to said bushings and said second semicylindrical surfaces being larger in diameter than said bushings.

* * * * *